United States Patent
Yoshida et al.

(10) Patent No.: US 8,355,104 B2
(45) Date of Patent: Jan. 15, 2013

(54) LIQUID CRYSTAL DISPLAY DEVICE

(75) Inventors: Norihiro Yoshida, Kumagaya (JP); Yoshitaka Yamada, Fukaya (JP); Jin Hirosawa, Saitama (JP); Arihiro Takeda, Saitama (JP)

(73) Assignee: Japan Display Central Inc., Fukaya-shi (JP)

( * ) Notice: Subject to any disclaimer, the term of this patent is extended or adjusted under 35 U.S.C. 154(b) by 1077 days.

(21) Appl. No.: 12/327,433

(22) Filed: Dec. 3, 2008

(65) Prior Publication Data

US 2009/0147201 A1 Jun. 11, 2009

(30) Foreign Application Priority Data

Dec. 11, 2007 (JP) ................................. 2007-320059

(51) Int. Cl.
*G02F 1/1337* (2006.01)
(52) U.S. Cl. ......... 349/128; 349/129; 349/144; 349/123
(58) Field of Classification Search .................. 349/144, 349/129, 123, 128
See application file for complete search history.

(56) References Cited

U.S. PATENT DOCUMENTS

| | | | |
|---|---|---|---|
| 6,661,488 B1 | 12/2003 | Takeda et al. | |
| 6,671,019 B1 * | 12/2003 | Petschek et al. | 349/129 |
| 6,992,329 B2 | 1/2006 | Wu et al. | |
| 7,023,516 B2 * | 4/2006 | Yoshida et al. | 349/143 |
| 7,495,724 B2 | 2/2009 | Yoshida et al. | |
| 7,656,474 B2 * | 2/2010 | Hanaoka et al. | 349/100 |
| 2005/0030458 A1 * | 2/2005 | Sasabayashi et al. | 349/129 |
| 2007/0024773 A1 | 2/2007 | Yamada et al. | |
| 2007/0029550 A1 | 2/2007 | Yoshida et al. | |
| 2007/0040969 A1 | 2/2007 | Yoshida et al. | |
| 2007/0040974 A1 | 2/2007 | Ninomiya et al. | |
| 2007/0046886 A1 | 3/2007 | Yamaguchi et al. | |
| 2007/0052912 A1 | 3/2007 | Kawata et al. | |
| 2007/0097297 A1 | 5/2007 | Kawata et al. | |
| 2007/0165166 A1 * | 7/2007 | Kawata et al. | 349/129 |
| 2007/0200990 A1 | 8/2007 | Hirosawa et al. | |
| 2007/0268434 A1 * | 11/2007 | Huang et al. | 349/129 |
| 2008/0007681 A1 * | 1/2008 | Chen et al. | 349/129 |
| 2008/0013025 A1 * | 1/2008 | Wu et al. | 349/129 |

(Continued)

FOREIGN PATENT DOCUMENTS

JP 11-258606 9/1999

(Continued)

OTHER PUBLICATIONS

U.S. Appl. No. 11/458,562, filed Jul. 19, 2006, Yoshida, et al.

(Continued)

*Primary Examiner* — Edward Glick
*Assistant Examiner* — Sang Nguyen
(74) *Attorney, Agent, or Firm* — Oblon, Spivak, McClelland, Maier & Neustadt, L.L.P.

(57) ABSTRACT

An MVA mode liquid crystal display device is configured such that a liquid crystal layer including liquid crystal molecules having negative dielectric constant anisotropy is held between a first substrate and a second substrate. The liquid crystal display device includes a structural body which controls an alignment direction of the liquid crystal molecules in a manner to form a multi-domain in each of pixels. The structural body includes a first structural body which is disposed in a manner to overlap a light-blocking wiring line, and a second structural body which is disposed in a direction substantially perpendicular to the first structural body and is formed to be narrower than the first structural body.

8 Claims, 10 Drawing Sheets

U.S. PATENT DOCUMENTS

| | | | |
|---|---|---|---|
| 2008/0074587 A1* | 3/2008 | Tien et al. | 349/106 |
| 2008/0192160 A1 | 8/2008 | Yoshida et al. | |
| 2010/0014012 A1* | 1/2010 | Irie et al. | 349/39 |

FOREIGN PATENT DOCUMENTS

| | | |
|---|---|---|
| JP | 2000-137227 | 5/2000 |
| JP | 2004-205903 | 7/2004 |
| JP | 2004-341487 | 12/2004 |
| JP | 2007-41126 | 2/2007 |
| JP | 2007-102164 | 4/2007 |
| JP | 2007-133054 | 5/2007 |

OTHER PUBLICATIONS

U.S. Appl. No. 12/882,608, filed Sep. 15, 2010, Takeda, et al.
U.S. Appl. No. 13/180,735, filed Jul. 12, 2011, Tokuoka, et al.
U.S. Appl. No. 13/369,057, filed Feb. 8, 2012, Hirosawa.
U.S. Appl. No. 13/405,799, filed Feb. 27, 2012, Hirosawa, et al.
U.S. Appl. No. 13/469,458, filed May 11, 2012, Takeda, et al.
U.S. Appl. No. 13/470,578, filed May 14, 2012, Takeda, et al.

* cited by examiner

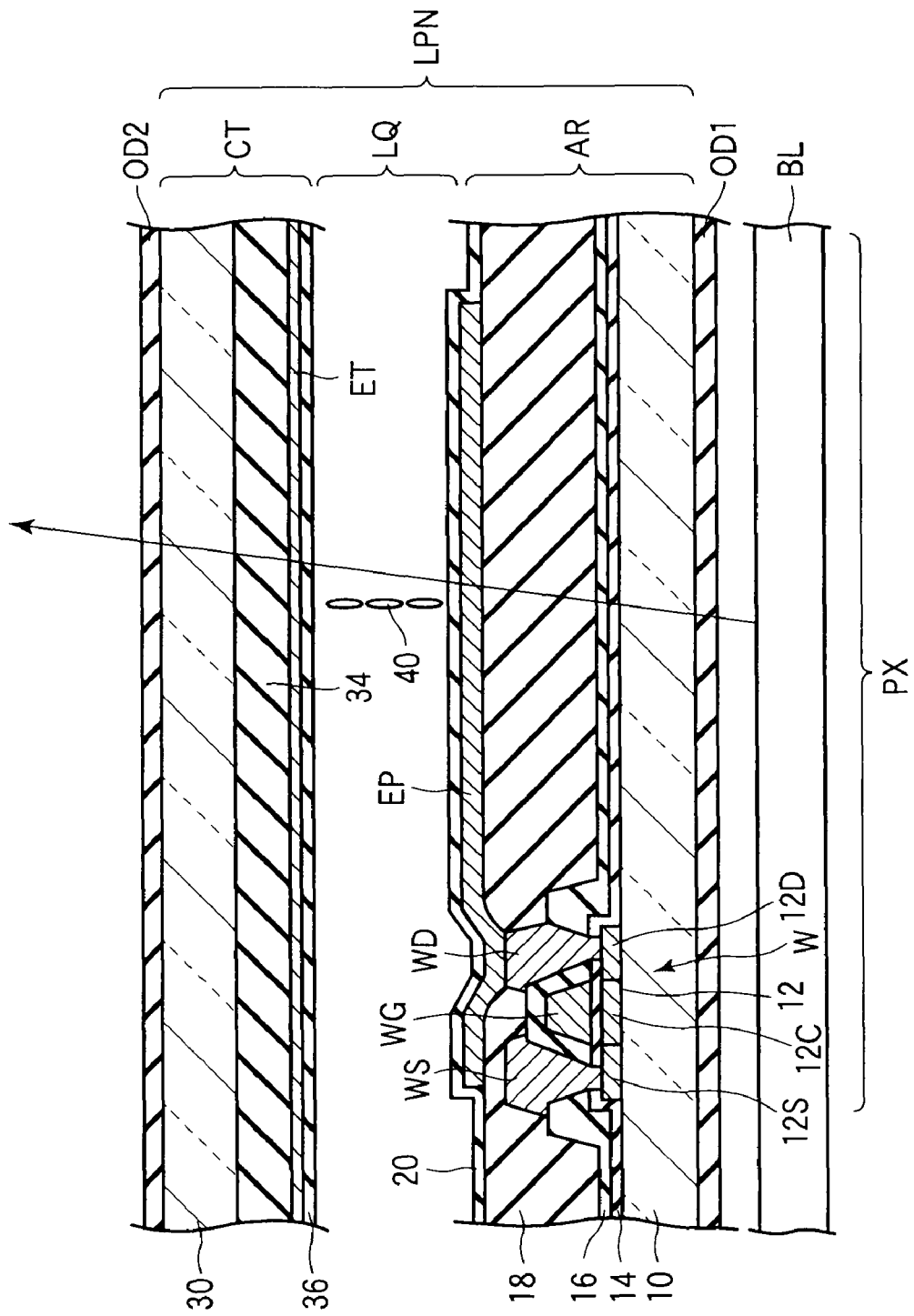
F I G. 2

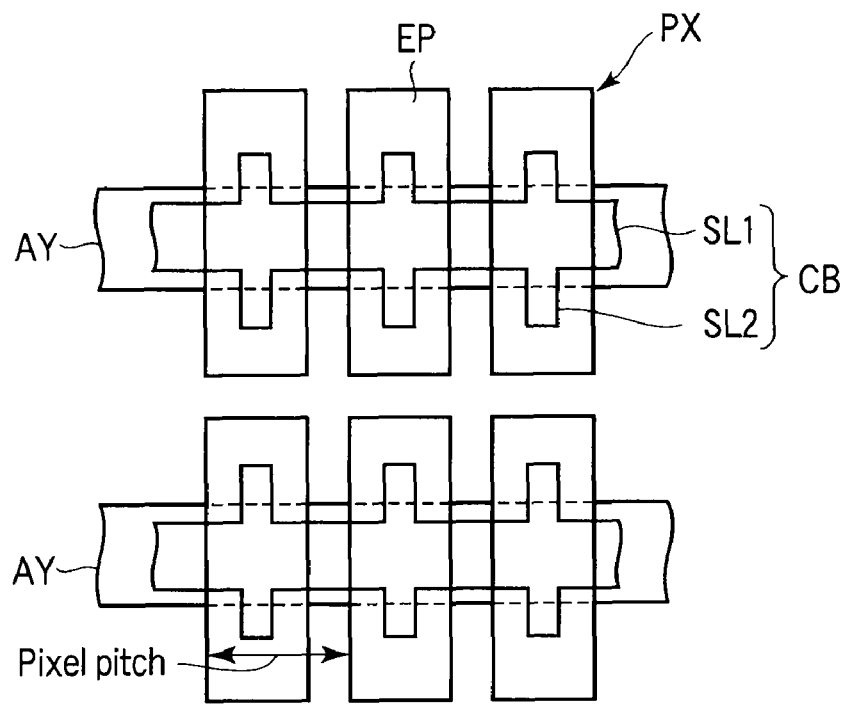
F I G. 11
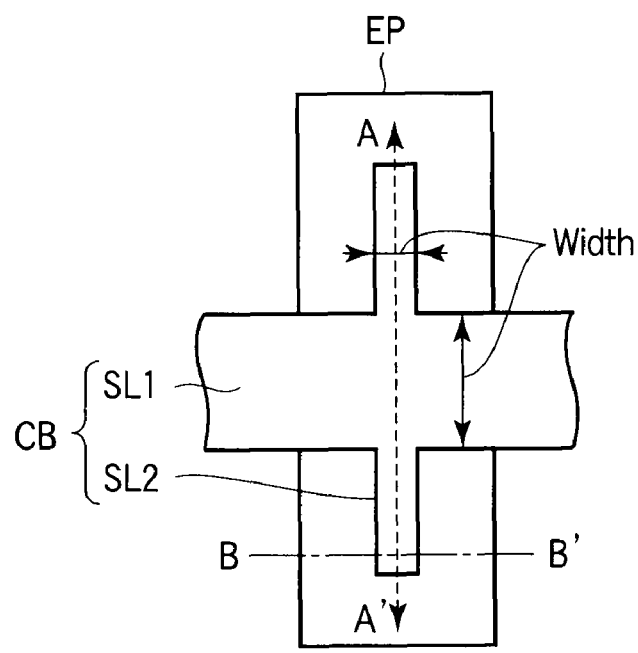
F I G. 12

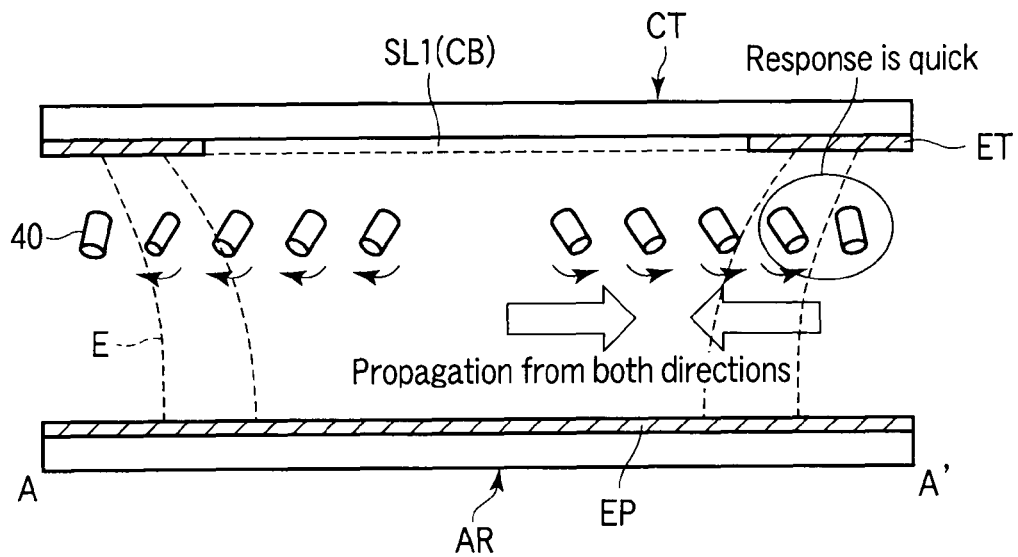
F I G. 13
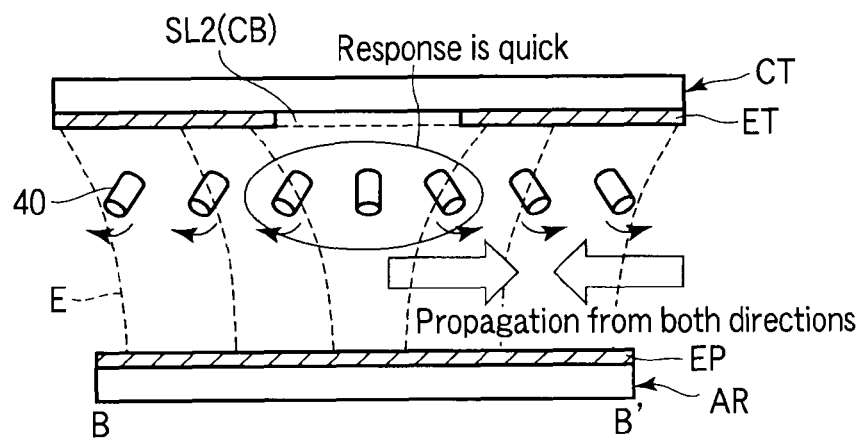
F I G. 14
| Pixel pitch (μm) | 25 | 30 | 42 | 50 | 75 |
|---|---|---|---|---|---|
| Image quality (roughness) | ○ | ○ | ○ | △ | × |
F I G. 15

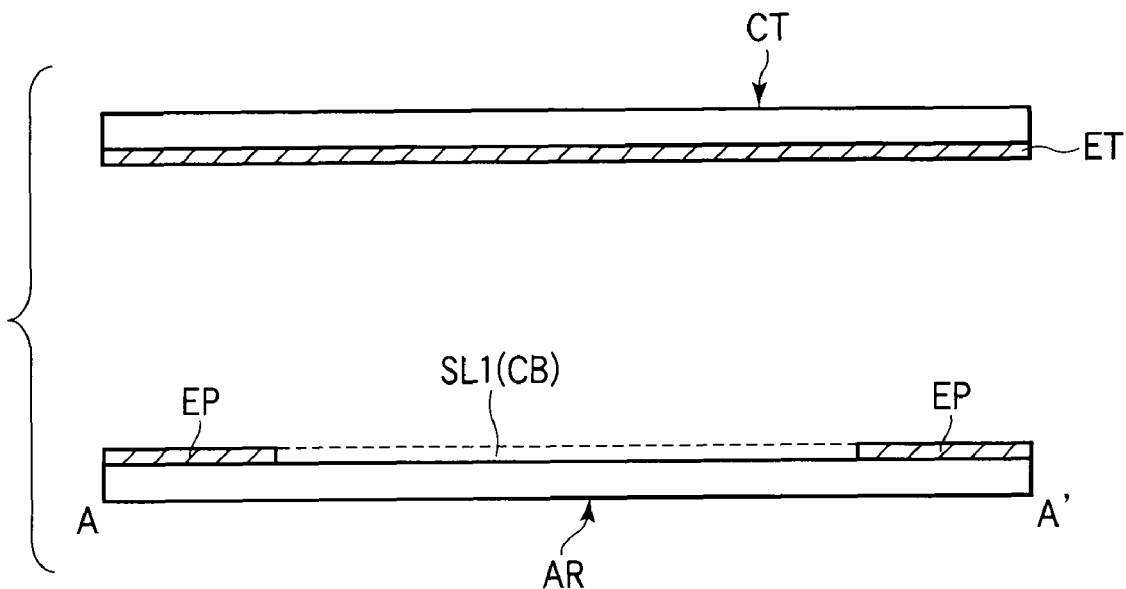
F I G. 18
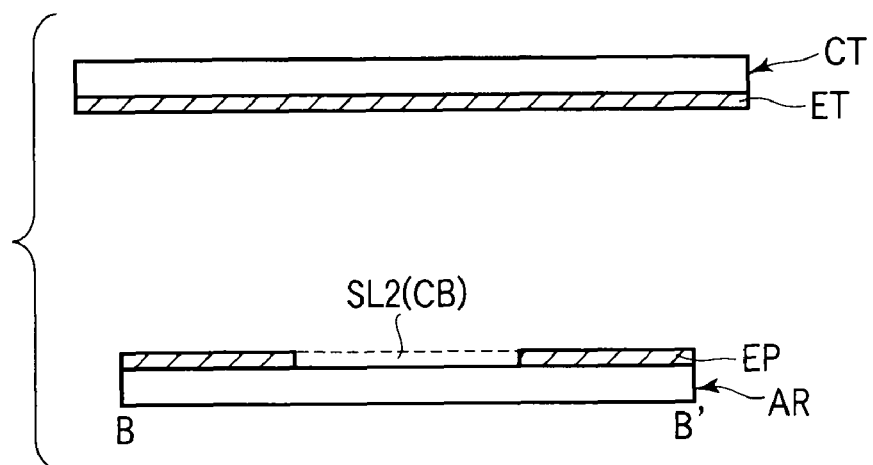
F I G. 19

LIQUID CRYSTAL DISPLAY DEVICE

CROSS-REFERENCE TO RELATED APPLICATIONS

This application is based upon and claims the benefit of priority from prior Japanese Patent Application No. 2007-320059, filed Dec. 11, 2007, the entire contents of which are incorporated herein by reference.

BACKGROUND OF THE INVENTION

1. Field of the Invention

The present invention relates generally to a liquid crystal display device, and more particularly to a liquid crystal display device which adopts a multi-domain vertical alignment mode.

2. Description of the Related Art

A liquid crystal display device has various features such as small thickness, light weight and low power consumption, and is applied to various uses, e.g. OA equipment, information terminals, timepieces, and TVs. In particular, a liquid crystal display device comprising thin-film transistors (TFTs) including thin-film transistors (hereinafter "TFTs") has high image quality performance and, therefore, it is widely used as a monitor of a portable TV, a computer, etc., which displays a great deal of information.

In recent years, with an increase in information amount, there has been an increasing demand for higher definition of images and for a higher display speed. The higher definition of images can be realized, for example, by making finer the array structure which is composed of the above-described TFTs. Of display modes of liquid crystal display devices, a vertical aligned nematic (VAN) mode has a higher response speed than a conventional twisted nematic (TN) mode. An additional feature of the VAN mode is that a rubbing process, which may lead to a defect such as an electrostatic breakage, can be made needless by vertical alignment.

In particular, a multi-domain VAN (MVA) is widely put to practical use since the viewing angle can relatively easily be increased.

In the MVA mode, liquid crystal molecules are aligned in a plurality of directions when a voltage is applied to the liquid crystal layer, for example, by means of mask rubbing, devices of pixel electrode structures, or protrusions provided in pixels. Thereby, a multi-domain is formed, and an improvement in symmetry of viewing angle characteristics and suppression of an inversion phenomenon are realized. In addition, the viewing angle dependency of the retardation of the liquid crystal layer in the state in which the liquid crystal molecules are vertically aligned, that is, in the black display mode, is compensated by using a negative retardation plate. Thereby, the viewing angle dependency of the contrast ratio (CR) is improved. Furthermore, by applying a biaxial retardation plate with an in-plane retardation to the negative retardation plate, the viewing angle dependency of the polarizer plate is also compensated, and still higher CR viewing angle characteristics are realized.

For example, patent document 1 (Jpn. Pat. Appln. KOKAI Publication No. H11-258606) discloses a technique relating to the MVA. Patent document 1 discloses domain restriction means, such as a protrusion, a recess or a slit, as means for forming a multi-domain. In a concrete example, a protrusion is provided on a counter-electrode, and neighboring pixel electrodes on an array substrate are disposed at a predetermined interval or more, thereby realizing a multi-domain. Patent document 1 describes that in the prior art the protrusion needs to have a predetermined width or more and a predetermined height or more from the standpoint of alignment stability, and that if sufficient width and height are not obtained, the alignment stability would deteriorate, leading to image quality degradation such as roughness and lowering in response speed.

On the other hand, since the protrusion is provided within the pixel, there occurs local light leak due to a stepped portion of the protrusion or a decrease in transmittance due to a voltage drop. Thus, the fact is that the protrusion itself is a factor of degradation in image quality. Moreover, if the interval of pixel electrodes is to be increased, the opening ratio decreases and the transmittance lowers.

As has been described above, from the standpoint of the transmittance and contrast, it is desirable that the size of the protrusion and the interval of the pixel electrodes be as small as possible. In short, the size of the protrusion and the interval of pixel electrodes are determined from the relationship of trade-off between the optical characteristics and the alignment stability.

As other techniques for forming the multi-domain, there are known techniques disclosed in patent documents 2 to 4 (Jpn. Pat. Appln. KOKAI Publication No. 2004-205903, Jpn. Pat. Appln. KOKAI Publication No. 2004-341487 and Jpn. Pat. Appln. KOKAI Publication No. 2007-041126).

In recent years, also in the field of displays for mobile terminals, microfabrication has been progressed to realize very high definition of 300 ppi or more, and there is a strong demand for the capability of displaying motion video. Although the optical characteristics, such as transmittance and contrast, are in a sufficiently tolerable level, the response time is not sufficient and there is a demand for improvement in display quality at the time of motion video display.

BRIEF SUMMARY OF THE INVENTION

The present invention has been made in consideration of the above-described problems, and the object of the invention is to provide a liquid crystal display device adopting a multi-domain vertical alignment mode, which can decrease a response time, while maintaining optical characteristics in a tolerable level.

According to a first aspect of the present invention, there is provided a liquid crystal display device which is configured such that a liquid crystal layer including liquid crystal molecules having negative dielectric constant anisotropy is held between a first substrate and a second substrate, comprising: pixel electrodes which are disposed in association with a plurality of pixels which are arrayed in a matrix, in the first substrate; a first alignment film which is disposed in a manner to cover the pixel electrodes and aligns the liquid crystal molecules in a direction substantially perpendicular to the first substrate; light-blocking wiring lines which are disposed in a manner to cross the pixel electrodes and are formed of a light-blocking, electrically conductive material; a counter-electrode which is disposed in common with the plurality of pixels, in the second substrate; a second alignment film which is disposed in a manner to cover the counter-electrode and aligns the liquid crystal molecules in a direction substantially perpendicular to the second substrate; and an insulative protrusion which controls an alignment direction of the liquid crystal molecules in a manner to form a multi-domain in each of the pixels, wherein the protrusion includes a first protrusion which is disposed in a manner to overlap the light-blocking wiring line, and a second protrusion which is disposed in a direction substantially perpendicular to the first protrusion and is formed to be narrower than the first protrusion.

According to a second aspect of the present invention, there is provided a liquid crystal display device which is configured such that a liquid crystal layer including liquid crystal molecules having negative dielectric constant anisotropy is held between a first substrate and a second substrate, comprising: pixel electrodes which are disposed in association with a plurality of pixels which are arrayed in a matrix, in the first substrate; a first alignment film which is disposed in a manner to cover the pixel electrodes and aligns the liquid crystal molecules in a direction substantially perpendicular to the first substrate; light-blocking wiring lines which are disposed in a manner to cross the pixel electrodes and are formed of a light-blocking, electrically conductive material; a counter-electrode which is disposed in common with the plurality of pixels, in the second substrate; a second alignment film which is disposed in a manner to cover the counter-electrode and aligns the liquid crystal molecules in a direction substantially perpendicular to the second substrate; and a slit portion which controls an alignment direction of the liquid crystal molecules in a manner to form a multi-domain in each of the pixels, and is formed in the pixel electrode or the counter-electrode, wherein the slit portion includes a first slit portion which is formed in a manner to overlap the light-blocking wiring line, and a second slit portion which is disposed in a direction substantially perpendicular to the first slit portion and is formed to be narrower than the first slit portion.

The present invention can provide a liquid crystal display device adopting a multi-domain vertical alignment mode, which can decrease a response time, while maintaining optical characteristics in a tolerable level.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a cross-sectional view that schematically shows the structure of the liquid crystal display device shown in FIG. 1;

FIG. 11 is a plan view for describing the positional relationship between pixels and structural bodies (slit portions) in a liquid crystal display device according to concrete example 3;

FIG. 12 schematically shows the structure of one pixel in concrete example 3;

FIG. 13 is a cross-sectional view of the liquid crystal display panel, taken along line A-A' in FIG. 12;

FIG. 14 is a cross-sectional view of the liquid crystal display panel, taken along line B-B' in FIG. 12;

FIG. 15 is a table showing an evaluation result of the roughness of image quality in relation to pixel pitches;

FIG. 18 shows a modification of concrete example 3, and is a cross-sectional view of the liquid crystal display panel, taken along line A-A' in FIG. 12; and FIG. 19 shows the modification of concrete example 3, and is a cross-sectional view of the liquid crystal display panel, taken along line B-B' in FIG. 12.

DETAILED DESCRIPTION OF THE INVENTION

A liquid crystal display device according to an embodiment of the present invention will now be described with reference to the accompanying drawings. In this embodiment, a liquid crystal display device, in which at least a part of each of pixels is composed as a transmissive display part that displays an image by selectively passing backlight, is exemplified.

Figure 1:
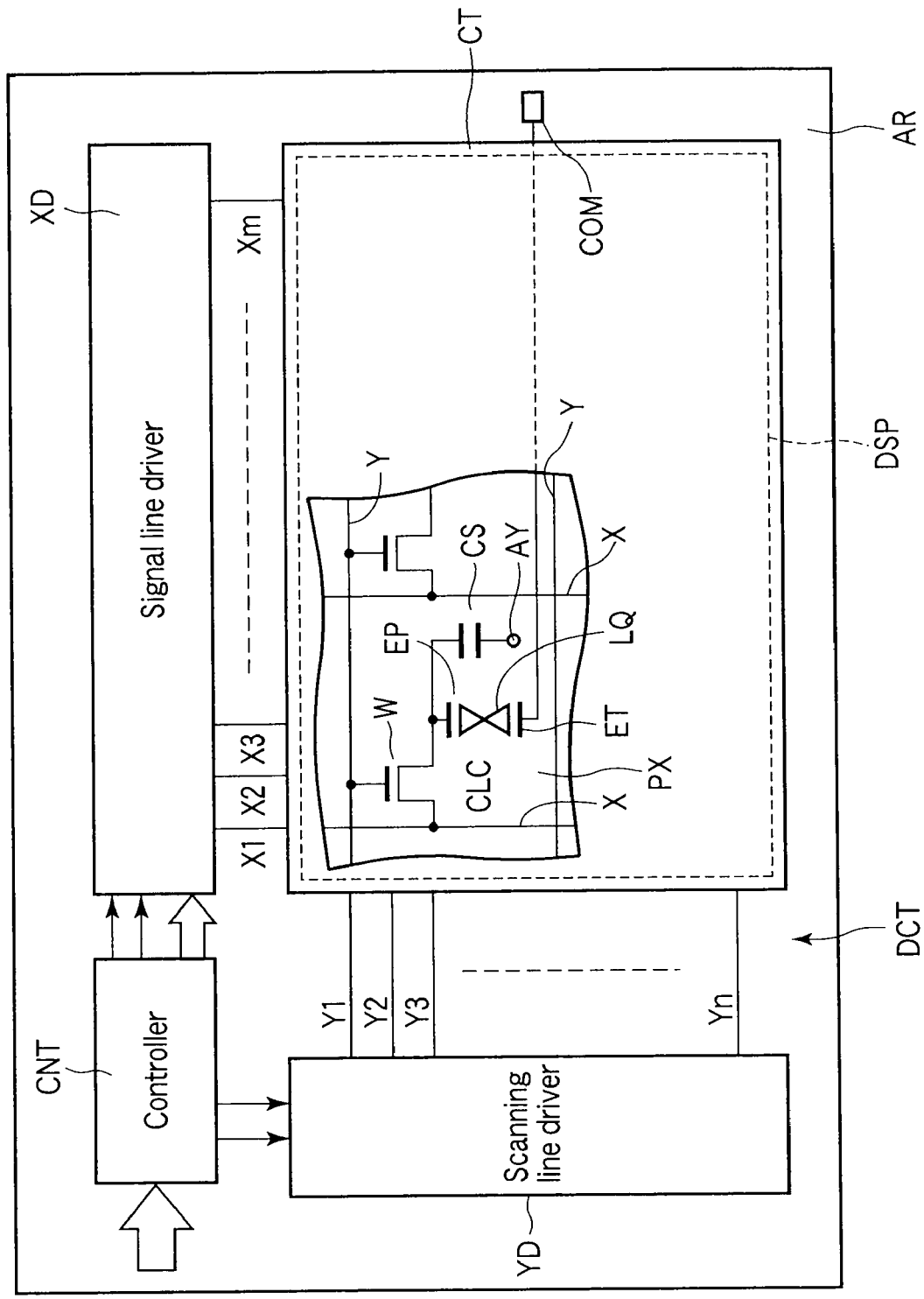
FIG. 1 schematically shows the structure of a liquid crystal display device according to an embodiment of the present invention.

As is shown in FIG. 1 and FIG. 2, the liquid crystal display device is an active-matrix-type color liquid crystal device, which includes a liquid crystal display panel LPN. The liquid crystal display panel LPN is configured to include an array substrate (first substrate) AR, a counter-substrate (second substrate) CT which is disposed to be opposed to the array substrate AR, and a liquid crystal layer LQ which is held between the array substrate AR and the counter-substrate CT.

In addition, the liquid crystal display device includes a first optical element OD1 which is provided on one of outer surfaces of the liquid crystal display panel LPN (i.e. a surface of the array substrate AR, which is opposed to the other surface thereof that is in contact with the liquid crystal layer LQ), and a second optical element OD2 which is provided on the other outer surface of the liquid crystal display panel LPN (i.e. a surface of the counter-substrate CT, which is opposed to the other surface thereof that is in contact with the liquid crystal layer LQ). Further, the liquid crystal display device includes a backlight unit BL which illuminates the liquid crystal display panel LPN from the first optical element OD1 side.

The liquid crystal display panel LPN includes a display region DSP that displays an image. The display region DSP is composed of a plurality of pixels PX which are arrayed in a matrix of m×n.

The array substrate AR is formed by using an insulating substrate 10 having light transmissivity, such as a glass plate or a quartz plate. Specifically, the array substrate AR includes, in the display region DSP, an (m×n) number of pixel electrodes EP which are disposed in the respective pixels, an n-number of scanning lines Y (Y1 to Yn) which are disposed in a manner to extend in the row direction of the pixel electrodes EP, an m-number of signal lines X (X1 to Xm) which are disposed in a manner to extend in the column direction of the pixel electrodes EP, an (m×n) number of switching elements W (e.g. thin-film transistors) which are disposed in regions including intersections between the scanning lines Y and signal lines X in the respective pixels PX, and storage capacitance lines AY which are disposed in a manner to extend in the row direction, like the scanning lines Y, and are capacitive-coupled to the pixel electrodes EP so as to constitute storage capacitances CS in parallel with liquid crystal capacitances CLC.

The scanning lines Y and storage capacitance lines AY are disposed substantially in parallel, and may be formed of the same material. The storage capacitance lines AY are opposed to the pixel electrodes EP via an insulation film such as an interlayer insulation film 16, and are disposed in a manner to cross the plural pixel electrodes EP. The signal lines X are disposed so as to cross, substantially at right angles, the scanning lines Y and storage capacitance lines AY via the interlayer insulation film 16. These signal lines X, scanning lines Y and storage capacitance lines AY are light-blocking wiring lines which are formed of a light-blocking, electrically conductive material such as aluminum, molybdenum, tungsten or titanium.

Each of the switching elements W is, for instance, an n-channel thin-film transistor, and includes a semiconductor layer 12 which is disposed on the insulating substrate 10. The semiconductor layer 12 can be formed of, e.g. polysilicon or amorphous silicon. In this embodiment, the semiconductor layer 12 is formed of polysilicon. The semiconductor layer 12 includes a source region 12S and a drain region 12D, between which a channel region 12C is interposed. The semiconductor layer 12 is covered with a gate insulation film 14.

A gate electrode WG of the switching element W is connected to one associated scanning line Y (or formed integral with the scanning line Y), and is disposed, together with the scanning line Y and storage capacitance line AY, on the gate insulation film 14. The gate electrode WG, scanning line Y and storage capacitance line AY are covered with the interlayer insulation film 16. The gate insulation film 14 and interlayer insulation film 16 are formed of an inorganic material such as silicon oxide or silicon nitride.

A source electrode WS and a drain electrode WD of the switching element W are disposed on the interlayer insulation film 16 on both sides of the gate electrode WG. The source electrode WS is connected to one associated signal line X (or formed integral with the signal line X) and is put in contact with the source region 12S of the semiconductor layer 12. The drain electrode WD is connected to one associated pixel electrode EP (or formed integral with the pixel electrode EP) and is put in contact with the drain region 12D of the semiconductor layer 12. The source electrode WS, drain electrode WD and signal line X are covered with a protection insulation film 18. The protection insulation film 18 is formed of, e.g. an organic material.

The pixel electrode EP is disposed on the protection insulation film 18 and is electrically connected to the drain electrode WD via a contact hole which is formed in the organic insulation film 18. The pixel electrode EP is formed of a light-transmissive electrically conductive material such as indium tin oxide (ITO) or indium zinc oxide (IZO). The pixel electrode EP, which is associated with each pixel PX, is covered with a first alignment film 20.

On the other hand, the counter-substrate CT is formed by using a light-transmissive insulating substrate 30 such as a glass plate or a quartz plate. Specifically, the counter-substrate CT includes a counter-electrode ET in the display region DSP. The counter-electrode ET is disposed to be opposed to the pixel electrodes EP in association with the plural pixels PX. The counter-electrode ET is formed of a light-transmissive electrically conductive material such as ITO. The counter-electrode ET is covered with a second alignment film 36.

The liquid crystal display device of a color display type includes a color filter layer 34 which is provided on the inner surface of the liquid crystal display panel LPN in association with each pixel. In the example shown in FIG. 2, the color filter layer 34 is provided on the counter-substrate CT. The color filter layer 34 is formed of color resins of a plurality of different colors, for example, the three primary colors of red, blue and green. The red color resin, blue color resin and green color resin are disposed in association with a red pixel, a blue pixel and a green pixel, respectively.

The color filter layer 34 may be disposed on the array substrate AR side. In this case, the protection insulation film 18 of the array substrate AR may be replaced with a color filter layer 34.

The respective pixels PX are partitioned by a black matrix (not shown). The black matrix is disposed to be opposed to wiring lines, such as scanning lines Y, signal lines X and switching elements W, which are provided on the array substrate AR. In order to reduce the influence of irregularities on the surface of the color filter layer 34, an overcoat layer may be disposed between the color filter layer 34 and the counter-electrode ET.

When the counter-substrate CT and the above-described array substrate AR are disposed such that their first alignment film 20 and second alignment film 36 are opposed, a predetermined gap is provided by spacers (e.g. columnar spacers which are formed of resin material so as to be integral with one of the substrates) not shown, which are disposed between both alignment films 20 and 36. The liquid crystal layer LQ is composed of a liquid crystal composition including liquid crystal molecules 40, which is sealed in the gap between the first alignment film 20 of the array substrate AR and the second alignment film 36 of the counter-substrate CT. The liquid crystal molecules 40 have negative dielectric constant anisotropy.

The first alignment film 20 and second alignment film 36 have such characteristics as to align the liquid crystal molecules 40 substantially perpendicular to the insulating substrate 10 (or array substrate AR) and the insulating substrate 30 (or counter-substrate CT). The material of the first alignment film 20 and second alignment film 36 is not basically limited if the first alignment film 20 and second alignment film 36 are formed of light-transmissive thin films having vertical alignment properties.

In a driving circuit region DCT in the vicinity of the display region DSP of the array substrate AR, the liquid crystal display device includes at least a part of a scanning line driver YD which is connected to the n-number of scanning lines Y and at least a part of a signal line driver XD which is connected to the m-number of signal lines X. In this case, the scanning line driver YD and signal line driver XD may include, like the switching elements W, thin-film transistors including polysilicon.

The scanning line driver YD successively supplies scanning signals (driving signals) to the n-number of scanning lines Y on the basis of the control by a controller CNT. The signal line driver XD supplies, under the control of the controller CNT, video signals (driving signals) to the m-number of signal lines X at a timing when the switching elements W of each row are turned on by the scanning signal. Thereby, the pixel electrodes EP in each row are set at pixel potentials corresponding to the video signals that are supplied via the associated switching elements W.

The first optical element OD1 and second optical element OD2 include at least polarizers, respectively. The polarizers are disposed such that their absorption axes intersect at right angles. Each of the first optical element OD1 and second optical element OD2 may include a retardation plate which imparts a proper retardation to transmissive light. For example, in a display mode which makes use of circular polarization, each of the first optical element OD1 and second optical element OD2 includes, in addition to the polarizer, a retardation plate which imparts a $\lambda/4$ retardation to transmissive light.

In the present embodiment, in a case where no voltage is applied between the pixel electrode EP and the counter-electrode ET or a voltage lower than a threshold voltage is applied between the pixel electrode EP and the counter-electrode ET, the liquid crystal molecules are aligned substantially parallel to the normal direction of the liquid crystal display panel LPN (i.e. the normal direction of the array substrate AR and counter-substrate CT) by the alignment control by the alignment films 20 and 36.

In this state, backlight that has passed through the first optical element OD1 travels through the liquid crystal layer LQ, and is then absorbed by the second optical element OD2. Thus, black display is effected.

On the other hand, in a case where a voltage of the threshold value or more is applied between the pixel electrode EP and the counter-electrode ET, the liquid crystal molecules are aligned oblique or substantially perpendicular to the normal direction of the liquid crystal display panel LPN (i.e. substantially parallel to the major surfaces of the array substrate AR and counter-substrate CT).

In this state, backlight that has passed through the first optical element OD1 travels through the liquid crystal layer LQ, and then passes through the second optical element OD2. Thus, white display is effected.

In this manner, the vertical alignment mode is realized.

In the meantime, the liquid crystal display device includes structural bodies which control the alignment direction of the liquid crystal molecules 40 so as to form multi-domains in the respective pixels PX.

In the present invention, in order to increase the region with an inclination of electric field, in addition to the function of restricting the direction of inclination of liquid crystal molecules 40, it was found, on the basis of various alignment simulations and evaluation results of trial models of panels, that the response time can be decreased while the optical characteristics, such as the transmittance and contrast ratio, are maintained at tolerable levels. Based on this finding, it is possible to realize a liquid crystal display device with a high display quality of motion video, wherein even in the case where the same liquid crystal material as in the prior art is used and the same cell gap as in the prior art is set in a high-definition panel of 300 ppi or more, the response time between gray levels at a time of intermediate gray level display can be reduced to ½ to ⅓ of that in the prior art.

Concrete examples of the liquid crystal display device including the structural body will now be described in detail.

In each of the concrete examples below, the liquid crystal display device is constructed as a VGA color active-matrix liquid crystal display device having a diagonal screen size of 2.4 inches for mobile terminals, and having RGB pixels, the number of which is 640 (vertical)×320 (horizontal). The resolution of the display device is 332 ppi (pixels/inch). The size of one pixel is 75 µm in the longitudinal direction (i.e. the column direction) and 25 µm in the transverse direction (i.e. the row direction). Thus, the pixel electrode EP of each pixel is formed in a substantially rectangular direction having a long side in the column direction and a short side in the row direction.

In the present embodiment, the interval of repetition of each pixel in the transverse direction (i.e. the length in the row direction of each pixel) is referred to as a pixel pitch.

In each of the concrete examples, the interval $1p$ of neighboring pixel electrodes is about 8 µm, and the cell gap d (i.e. the thickness of the liquid crystal layer held between the first alignment film and second alignment film) is 3 µm. As the material of the liquid crystal layer LQ, use was made of a fluorine-based liquid crystal material (manufactured by Merck & Co. Inc.) having a refractive index anisotropy $\Delta n$ of 0.09, a dielectric constant anisotropy $\Delta \in$ of −5 in the n-type, and a rotational viscosity coefficient of 100 mPa·S.

CONCRETE EXAMPLE 1

Figure 3:
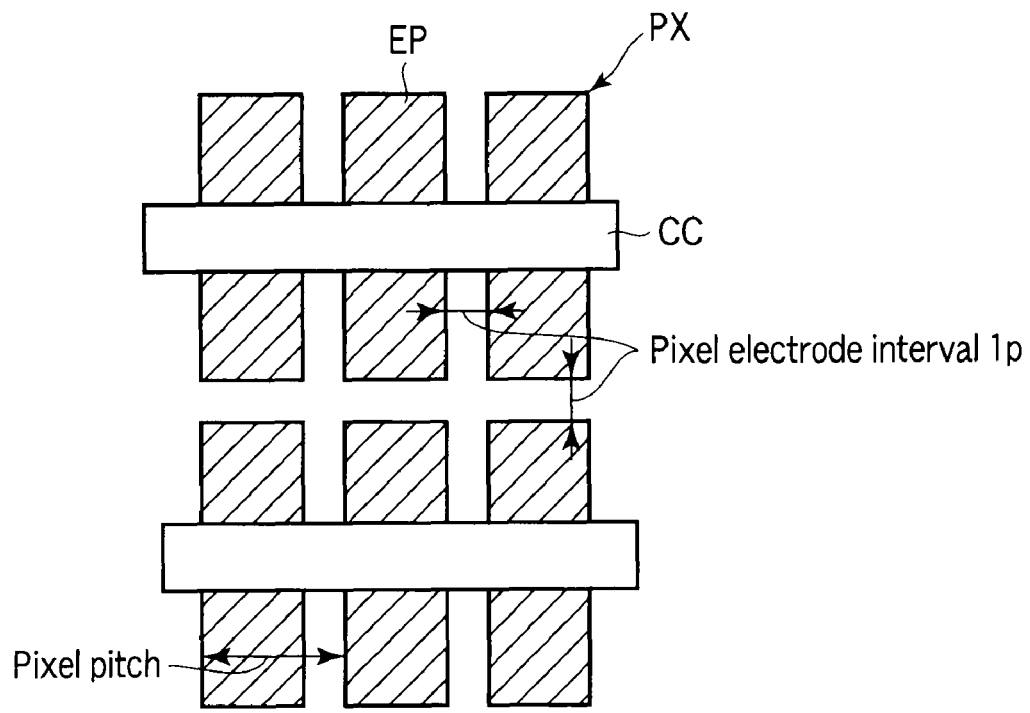
FIG. 3 is a plan view for describing the positional relationship between pixels and structural bodies (protrusions) in a liquid crystal display device according to concrete example 1.

Concrete example 1 shown in FIG. 3 adopts a method in which one pixel PX is divided into two parts, and includes, as structural bodies, protrusions CC on the counter-substrate side. The protrusion extends in the row direction through a substantially central part of the pixel electrode EP so as to divide each pixel into two parts, and the protrusion CC is disposed so as to cross each of the pixel electrodes EP disposed in plural pixels.

The protrusion CC having the stripe shape has a width (i.e. the length in the column direction) of, e.g. 10 µm and a height of, e.g. 1.5 µm. The length (i.e. the length in the row direction) of the protrusion CC is equal to or greater than the transverse length of the pixel. In this example, the protrusion CC has a length of 25 µm or more. The protrusion CC was formed of an acrylic photosensitive resin material.

Figure 4:
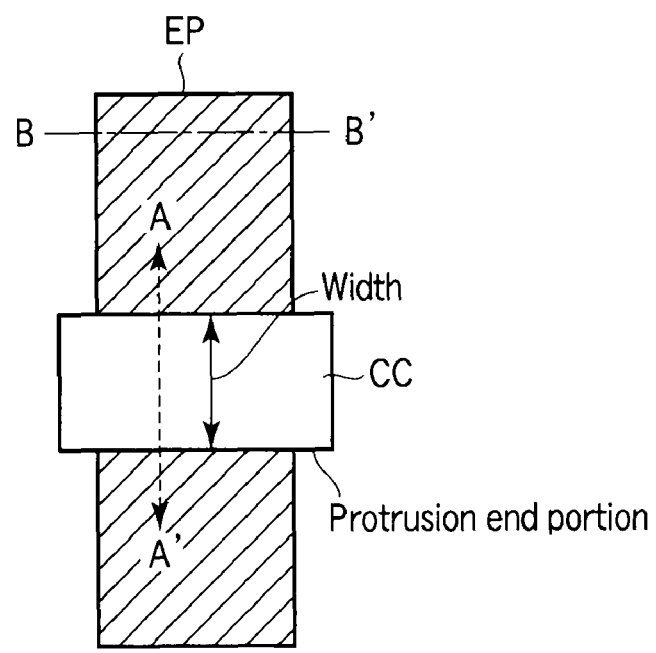
FIG. 4 schematically shows the structure of one pixel in concrete example 1.
Figure 5:
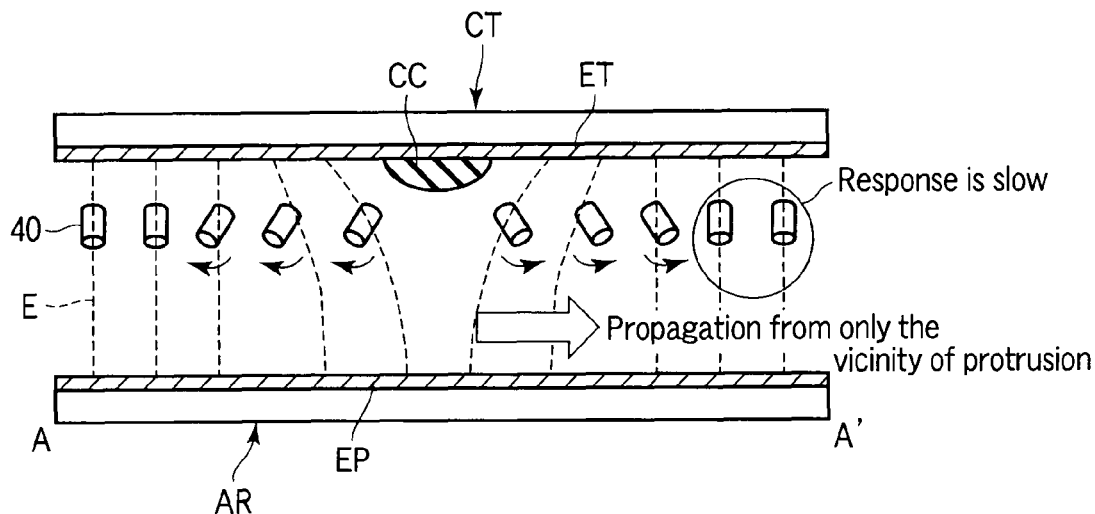
FIG. 5 is a cross-sectional view of the liquid crystal display panel, taken along line A-A' in FIG. 4.
Figure 6:
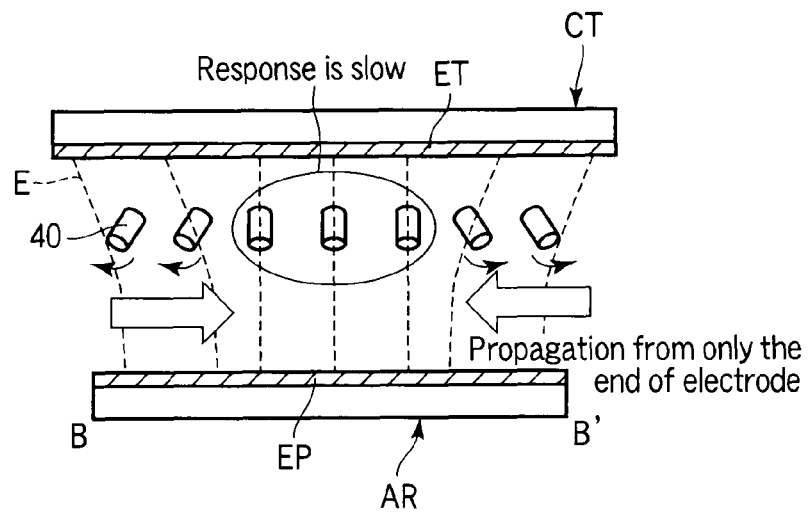
FIG. 6 is a cross-sectional view of the liquid crystal display panel, taken along line B-B' in FIG. 4.

FIG. 4 schematically shows the structure of one pixel. FIG. 5 is a cross-sectional view of the liquid crystal display panel, taken along line A-A' in FIG. 4, showing the state in which alignment of liquid crystal molecules 40 propagates when a voltage of a threshold value or more is applied between the pixel electrode EP and the counter-electrode ET. FIG. 6 is a cross-sectional view of the liquid crystal display panel, taken along line B-B' in FIG. 4, showing the state in which alignment of liquid crystal molecules 40 propagates when a voltage of a threshold value or more is applied between the pixel electrode EP and the counter-electrode ET. FIG. 3 to FIG. 6 show only main parts which are necessary for description.

Specifically, in the counter-substrate CT, the protrusion CC is disposed on the counter-electrode ET, and is covered with a second alignment film 36 (not shown). The protrusion CC has a semicircular cross-sectional shape. The array substrate AR includes the pixel electrode EP in each pixel, and a part of the pixel electrode EP is opposed to the protrusion CC.

As shown in FIG. 5 and FIG. 6, in a case where a voltage of a threshold value or more is applied between the pixel electrode EP and counter-electrode ET, an electric field (electric force lines) E is generated between the pixel electrode EP and counter-electrode ET, except for a part where the insulative protrusion CC is disposed. The liquid crystal molecules 40 are aligned and controlled in response to such an electric field E.

In particular, as regards the column direction, as shown in FIG. 5, an electric field E in the normal direction of the liquid crystal display panel is generated in the region which is sufficiently away from the protrusion CC. On the other hand, an electric field E, which is oblique to the normal direction of the liquid crystal display panel in a manner to avoid the protrusion CC, is generated at the region where the protrusion CC is disposed and the neighborhood of this region.

At this time, the liquid crystal molecules 40 are aligned so as to be inclined to the normal direction by the influence of the oblique electric field E. The direction of alignment of liquid crystal molecules 40 depends on the direction of the electric field E with a relatively great inclination, which is generated in the vicinity of the protrusion CC. Specifically, the liquid crystal molecules 40 begin to incline from the vicinity of the protrusion CC, and the alignment of the liquid crystal gradually propagates in a direction away from this region as a base point (i.e. in a direction toward the region where the inclination of the electric field E is small).

As regards the row direction, as shown in FIG. 6, an electric field E, which is inclined to the normal direction of the liquid crystal display panel in a manner to avoid the gap between neighboring pixel electrodes, is generated in the vicinity of end portions of the pixel electrode EP (i.e. in the vicinity of the long side of the pixel electrode).

At this time, the direction of alignment of liquid crystal molecules 40 depends on the direction of the electric field E with a relatively great inclination, which is generated in the vicinity of the end portions of the pixel electrode EP. Specifically, the liquid crystal molecules 40 begin to incline from the vicinity of the end portion of the pixel electrode EP, and the alignment of the liquid crystal gradually propagates in a direction away from this region as a base point.

The above-described propagation time of the liquid crystal alignment in the row direction and column direction causes a delay in response time.

Hence, as the distance from the protrusion or the end portion of the pixel is greater (i.e. as the region with no inclination of the electric field is greater), the response time is longer. Conversely, as the distance from the protrusion or the end portion of the pixel is smaller (i.e. as the region with no inclination of the electric field is smaller), the response time is shorter. However, if the number of protrusions CC or pixel end portions is increased, the area (aperture ratio) that contributes to display becomes smaller, and the optical characteristics, such as the transmittance and contrast ratio, deteriorate. As described above, there is a trade-off between the response time and the optical characteristics, and it is difficult to make them compatible.

A liquid crystal cell, which was manufactured on the basis of concrete example 1 that has been described above with reference to FIG. 3 to FIG. 6, was assembled as a module, and the optical characteristics thereof were measured. The transmittance of the liquid crystal cell was 5%, and the contrast ratio was 700. The response time was 170 msec, under the condition that the slowest response time between gray levels was measured when eight gray levels were displayed. When motion video was displayed, so-called "trailing" with a visible after-image was confirmed, and the response time was insufficient.

CONCRETE EXAMPLE 2

Figure 7:
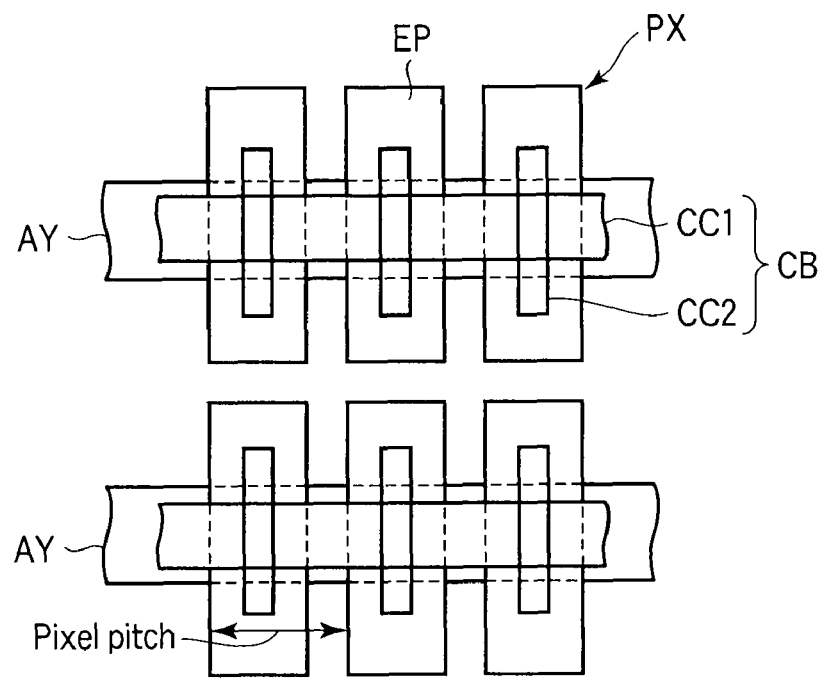
FIG. 7 is a plan view for describing the positional relationship between pixels and structural bodies (protrusions) in a liquid crystal display device according to concrete example 2.
Figure 8:
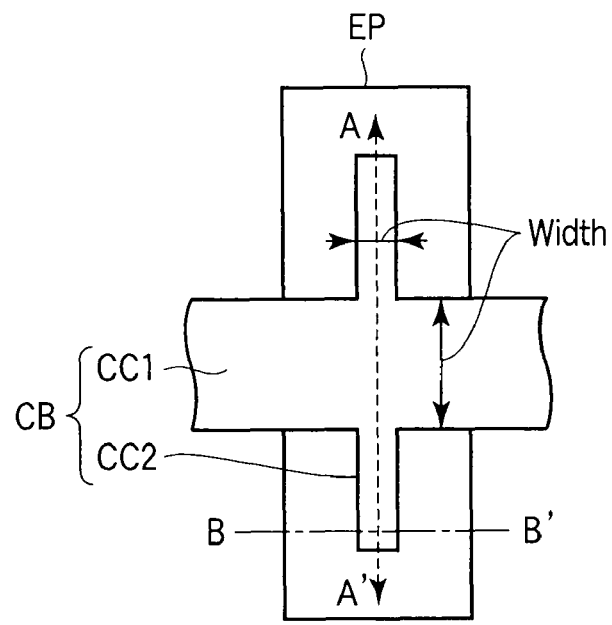
FIG. 8 schematically shows the structure of one pixel in concrete example 2.
Figure 9:
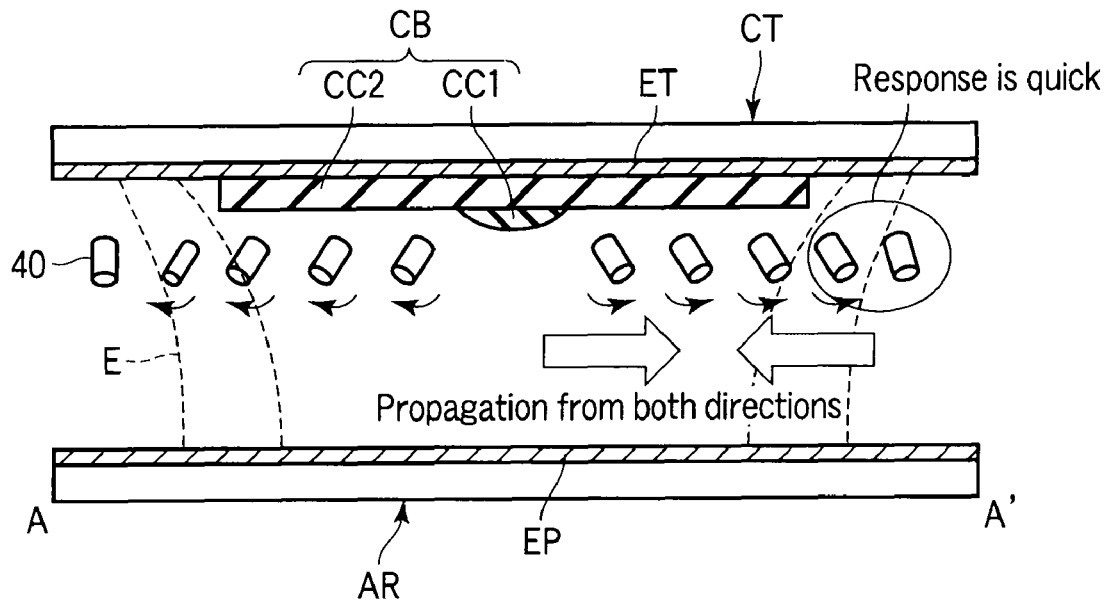
FIG. 9 is a cross-sectional view of the liquid crystal display panel, taken along line A-A' in FIG. 8.
Figure 10:
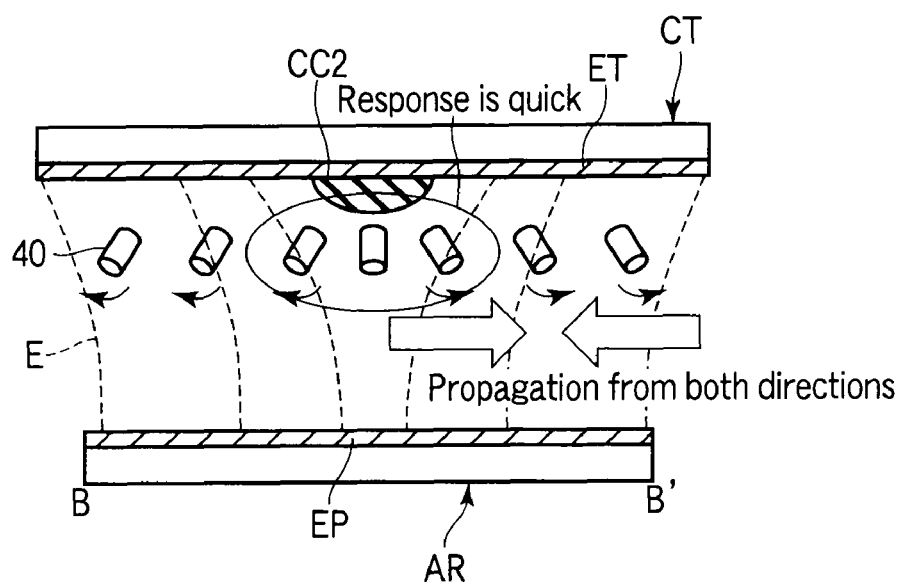
FIG. 10 is a cross-sectional view of the liquid crystal display panel, taken along line B-B' in FIG. 8.

FIG. 7 is a plan view showing a layout of concrete example 2. FIG. 8 schematically shows the structure of one pixel. FIG. 9 is a cross-sectional view of the liquid crystal display panel, taken along line A-A' in FIG. 8, showing the state in which alignment of liquid crystal molecules 40 propagates when a voltage of a threshold value or more is applied between the pixel electrode EP and the counter-electrode ET. FIG. 10 is a cross-sectional view of the liquid crystal display panel, taken along line B-B' in FIG. 8, showing the state in which alignment of liquid crystal molecules 40 propagates when a voltage of a threshold value or more is applied between the pixel electrode EP and the counter-electrode ET. FIG. 7 to FIG. 10 show only main parts which are necessary for description.

Concrete example 2 shown in FIG. 7 corresponds to one of embodiments of the invention. Concrete example 2 includes, as a structural body CB, a protrusion (first protrusion) CC1 corresponding to a first structural body and a protrusion (second protrusion) CC2 corresponding to a second structural body.

The protrusion CC1 has a stripe shape, like the protrusion CC of concrete example 1. The protrusion CC1 extends in the row direction through a substantially central part of the pixel electrode EP so as to divide each pixel into two parts, and the protrusion CC1 is disposed in common with plural pixels PX so as to cross the pixel electrode EP of each pixel. The protrusion CC1 is disposed so as to overlap light-blocking wiring. In this example, a storage capacitance line AY is disposed, as the light-blocking wiring line, so as to cross the pixel electrode EP, and the protrusion CC1 is disposed in a manner to overlap the storage capacitance line AY.

In this manner, the protrusion CC1 is disposed on that part within the pixel PX, which does not contribute to display. Specifically, the region, where local light leak occurs due to a stepped portion of the protrusion CC1 or a decrease in transmittance occurs due to a voltage drop, is configured to overlap the light-blocking wiring line. On the other hand, the protrusion CC1 can be formed with a maximum size from the standpoint of alignment stability. Thus, no decrease occurs in aperture ratio due to the provision of the protrusion CC1, and the alignment stability can be secured.

This protrusion CC1, like concrete example 1, has a width (i.e. the length in the column direction) of, e.g. 10 μm and a height of, e.g. 1.5 μm. The protrusion CC1 has a length (i.e. the length in the row direction) of 25 μm or more.

The protrusion CC2, like the protrusion CC1, has a stripe shape and is disposed in a manner to intersect at right angles with the protrusion CC1 within the pixel PX. Specifically, the protrusion CC2 extends in the column direction through a substantially central portion of the pixel electrode EP. In other words, the protrusion CC1 and protrusion CC2 are disposed so as to cross at a substantially central portion on the pixel electrode EP.

Thereby, on the pixel electrode EP, four substantially uniform areas, which are divided by the structural body CB, are formed. Compared to concrete example 1, the region where the inclined electric field is formed, which becomes the base point of liquid crystal alignment, can be increased. In short, the response time can be decreased.

The protrusion CC2 is formed to be narrower than the protrusion CC1. Specifically, the width of the protrusion CC1 is set at 10 μm, and the width of the protrusion CC2 (i.e. the length in the row direction) is set at 6 μm. Like the protrusion CC1, the height of the protrusion CC2 is set at 1.5 μm.

Parts of the protrusion CC2 are disposed on those parts within the pixel PX, which contribute to display. Thus, the protrusion CC2 is formed to have a minimum size in consideration of the alignment stability. Thereby, a decrease in aperture ratio can be minimized.

In concrete example 2, the protrusion CC2 extends substantially parallel to the long side of the pixel electrode EP and is formed to have a shorter length than the long side of the pixel electrode EP in one pixel. Specifically, the length in the column direction of the protrusion CC2 is less than the longitudinal length of the pixel and is set at 50 μm in this example.

In addition, both ends of the protrusion CC2 do not reach the short sides of the pixel electrode EP, and regions, where the pixel electrode EP is opposed to the counter-electrode ET, are formed between both ends of the protrusion CC2 and the short sides of the pixel electrodes EP.

It is desirable that the protrusions CC1 and CC2 be formed of a light-transmissive insulating material. For example, the protrusions CC1 and CC2 are formed by using an acrylic photosensitive resin material. The protrusions CC1 and CC2 can be formed at the same time by a single patterning step after the film of the photosensitive resin material is formed.

Specifically, in the counter-substrate CT, the protrusion CC1 and protrusion CC2 are disposed on the counter-electrode ET, and are covered with a second alignment film 36 (not shown). Each of the protrusions CC1 and CC2 has a semicircular cross-sectional shape. The array substrate AR includes the pixel electrode EP in each pixel, and a part of the pixel electrode EP is opposed to the protrusions CC1 and CC2.

As shown in FIG. 9 and FIG. 10, in a case where a voltage of a threshold value or more is applied between the pixel electrode EP and counter-electrode ET, an electric field (electric force lines) E is generated between the pixel electrode EP and counter-electrode ET, except for a part where the protrusions CC1 and CC2 are disposed. The liquid crystal molecules 40 are aligned and controlled in response to such an electric field E.

As regards the column direction, as has been described with reference to FIG. 5, an electric field E, which is inclined to the normal direction of the liquid crystal display panel in a manner to avoid the protrusion CC1, is generated at the region where the protrusion CC1 is disposed and the neighborhood of this region. In addition, as shown in FIG. 9, since the protrusion CC2 extends in the column direction, an electric field E, which is inclined to the normal direction of the liquid crystal display panel in a manner to avoid the protrusion CC2, is generated at the region where the protrusion CC2 is disposed and the neighborhood of this region.

In particular, since the region, where the pixel electrode EP and counter-electrode ET are opposed, is formed between both ends of the protrusion CC2 and the short sides of the pixel electrode EP, an inclined electric field toward this region is formed in a manner to avoid the protrusion CC2.

Thus, the liquid crystal molecules 40 begin to incline from the vicinity of the protrusion CC1 and the vicinity of the short side of the pixel electrode EP, and the alignment of the liquid crystal gradually propagates in a direction away from these regions as base points (i.e. in a direction toward the region where the inclination of the electric field E is small). In concrete example 1, the liquid crystal alignment propagates only in one direction from the vicinity of the protrusion. By contrast, in concrete example 2, with the provision of the protrusion CC2, since the inclined electric field is generated in a manner to avoid the protrusion CC2, the liquid crystal alignment propagates in two directions from the vicinity of the protrusion CC1 and the vicinity of the short side of the pixel electrode EP.

As regards the row direction, as shown in FIG. 10, an electric field E, which is inclined to the normal direction of the liquid crystal display panel in a manner to avoid the protrusion CC2, is generated at the part where the protrusion CC2 is disposed and in the vicinity of this region. At the same time, an electric field E, which is inclined to the normal direction of the liquid crystal display panel in a manner to avoid the gap between neighboring pixel electrodes, is generated in the vicinity of the end portion of the pixel electrode EP (i.e. in the vicinity of the long side of the pixel electrode).

Thus, the liquid crystal molecules 40 begin to incline from the vicinity of the protrusion CC2 and the vicinity of the long side of the pixel electrode EP, and the alignment of the liquid crystal gradually propagates in a direction away from these regions as base points. In concrete example 1, the liquid crystal alignment propagates only in one direction from the vicinity of the long side of the pixel electrode EP. By contrast, in concrete example 2, the liquid crystal alignment propagates in two directions from the vicinity of the protrusion CC2 and the vicinity of the long side of the pixel electrode EP.

According to concrete example 2, the propagation time of liquid crystal alignment in the row direction and column direction can be made shorter than in concrete example 1.

A liquid crystal cell, which was manufactured on the basis of concrete example 2 that has been described above with reference to FIG. 7 to 10, was assembled as a module, and the optical characteristics thereof were measured. The transmittance of the liquid crystal cell was 4.6%, and the contrast ratio was 500. It was confirmed that the transmittance and contrast ratio were kept at sufficiently tolerable levels.

The response time was 60 msec, under the condition that the slowest response time between gray levels was measured when eight gray levels were displayed, and a sufficient improvement in response speed was confirmed. When motion video was displayed, no "trailing" was confirmed, and a higher display quality with higher smoothness than concrete example 1 was obtained.

Figure 16:
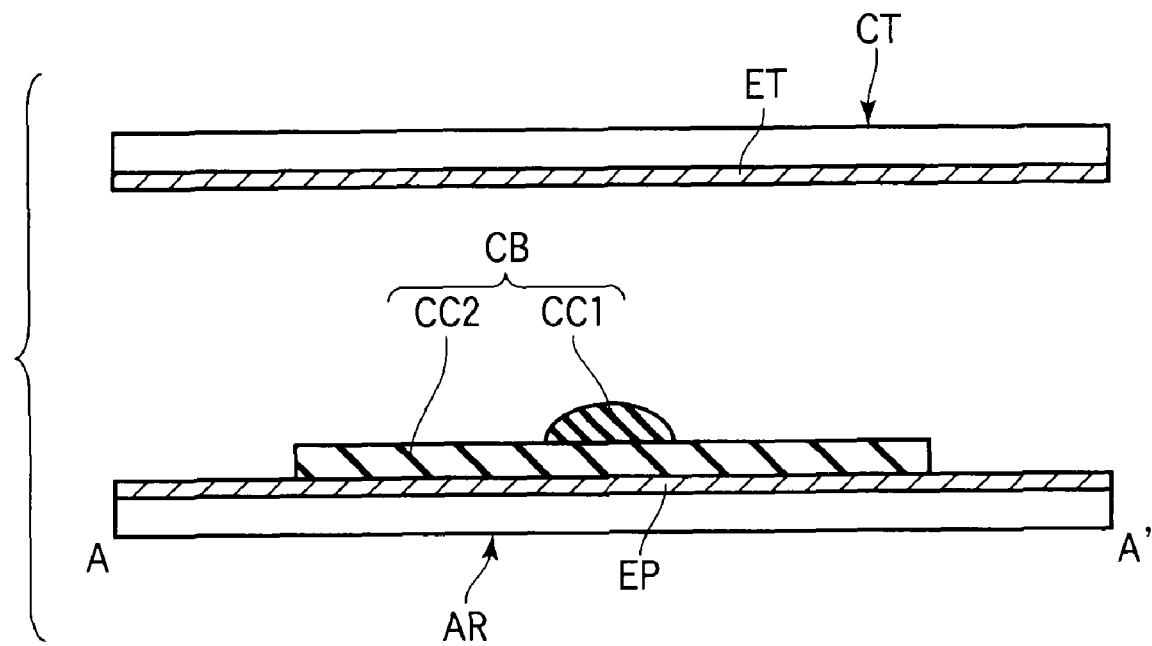
FIG. 16 shows a modification of concrete example 2, and is a cross-sectional view of the liquid crystal display panel, taken along line A-A' in FIG. 8.
Figure 17:
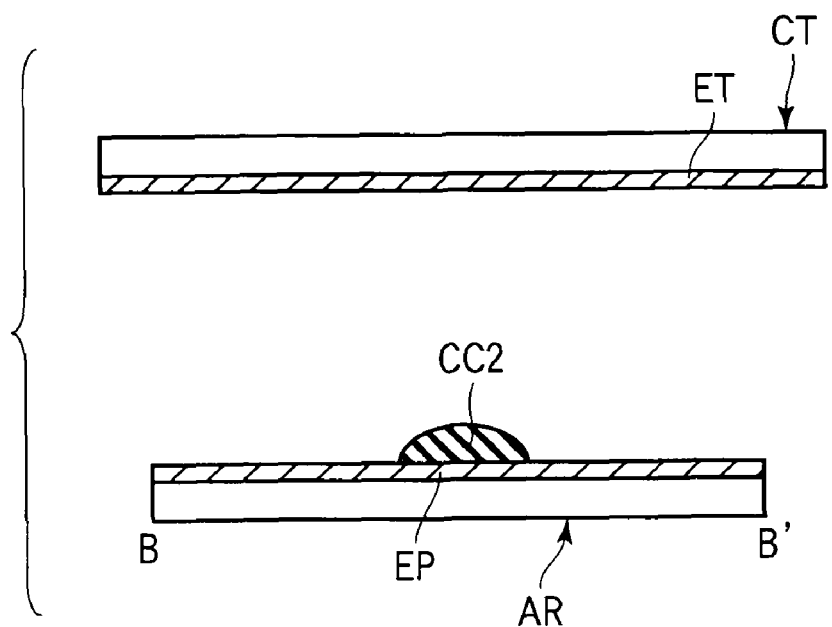
FIG. 17 shows the modification of concrete example 2, and is a cross-sectional view of the liquid crystal display panel, taken along line B-B' in FIG. 8.

In the above-described concrete example 2, the protrusions CC1 and CC2, which constitute the structural body CB, are disposed on the counter-substrate CT. Alternatively, as shown in FIG. 16 and FIG. 17, the protrusions CC1 and CC2 may be disposed on the pixel electrode EP in the array substrate AR. Besides, one of the protrusions CC1 and CC2 may be disposed on the array substrate AR, and the other may be disposed on the counter-substrate CT. In this manner, no matter whether the protrusions CC1 and CC2 are disposed on the counter-substrate CT or on the array substrate AR, the same advantageous effects can be obtained.

CONCRETE EXAMPLE 3

FIG. 11 is a plan view showing a layout of concrete example 3. FIG. 12 schematically shows the structure of one pixel. FIG. 13 is a cross-sectional view of the liquid crystal display panel, taken along line A-A' in FIG. 12, and FIG. 14 is a cross-sectional view of the liquid crystal display panel, taken along line B-B' in FIG. 12. FIG. 11 to FIG. 14 show only main parts which are necessary for description.

Concrete example 3 shown in FIG. 11 corresponds to one of embodiments of the invention. Concrete example 3 includes, as a structural body CB, a slit portion (first slit portion) SL1 corresponding to a first structural body and a slit portion (second slit portion) SL2 corresponding to a second structural body.

The slit portion SL1 has a stripe shape, like the protrusion CC of concrete example 1. The slit portion SL1 extends in the row direction through a substantially central part of the pixel electrode EP so as to divide each pixel into two parts, and the slit portion SL1 is disposed in common with plural pixels PX so as to cross the pixel electrode EP of each pixel. The slit portion SL1 is disposed so as to overlap the storage capacitance line AY that is the light-blocking wiring line.

This slit portion SL1, like concrete example 1, has a width (i.e. the length in the column direction) of, e.g. 10 μm and a length (i.e. the length in the row direction) of 25 μm or more.

The slit portion SL2, like the slit portion SL1, has a stripe shape and is disposed in a manner to intersect at right angles with the slit portion SL1 within the pixel PX. Specifically, the slit portion SL2 extends in the column direction through a substantially central portion of the pixel electrode EP. In other words, the slit portion SL1 and slit portion SL2 are disposed so as to cross at a substantially central portion on the pixel electrode EP.

The slit portion SL2 is formed to be narrower than the slit portion SL1. Specifically, the width of the slit portion SL1 is set at 10 μm, and the width of the slit portion SL2 (i.e. the length in the row direction) is set at 6 μm.

In concrete example 3, the slit portion SL2 extends substantially parallel to the long side of the pixel electrode EP and is formed to have a shorter length than the long side of the pixel electrode EP in one pixel. Specifically, the length in the column direction of the slit portion SL2 is less than the longitudinal length of the pixel and is set at 50 μm in this example.

In addition, both ends of the slit portion SL2 do not reach the short sides of the pixel electrode EP, and regions, where the pixel electrode EP is opposed to the counter-electrode ET, are formed between both ends of the slit portion SL2 and the short sides of the pixel electrodes EP.

The slit portions SL1 and SL2 are formed in the counter-electrode ET. The slit portions SL1 and SL2 can be formed at the same time by a step of patterning the counter-electrode ET. The array substrate AR includes the pixel electrode EP in each pixel, and a part of the pixel electrode EP is opposed to the slit portions SL1 and SL2.

In concrete example 3, too, on the pixel electrode EP, four substantially uniform areas, which are divided by the structural body CB, are formed. Compared to concrete example 1, the region where the inclined electric field is formed, which becomes the base point of liquid crystal alignment, can be increased. According to concrete example 3, like concrete example 2, the propagation time of liquid crystal alignment in the row direction and column direction can be made shorter than in concrete example 1. In short, the response time can be decreased.

A liquid crystal cell, which was manufactured on the basis of concrete example 3 that has been described above with reference to FIG. 11 to 14, was assembled as a module, and the optical characteristics thereof were measured. The transmittance of the liquid crystal cell was 5.0%, and the contrast ratio was 900. It was confirmed that better optical characteristics are obtainable than in concrete examples 1 and 2.

The response time was 70 msec, under the condition that the slowest response time between gray levels was measured when eight gray levels were displayed, and a sufficient improvement in response speed was confirmed. When motion video was displayed, no "trailing" was confirmed, and a higher display quality with higher smoothness than concrete example 1 was obtained.

In the above-described concrete example 3, the slit portions SL1 and SL2, which constitute the structural body CB, are formed in the counter-electrode ET. Alternatively, as shown in FIG. 18 and FIG. 19, the slit portions SL1 and SL2 may be formed in the pixel electrode EP in the array substrate AR. One of the slit portions SL1 and SL2 may be formed in the pixel electrode EP, and the other may be formed in the counter-electrode ET. In this manner, no matter whether the slit portions SL1 and SL2 are formed in the counter-electrode ET or in the pixel electrode EP, the same advantageous effects can be obtained.

CONCRETE EXAMPLE 4

Concrete example 4 corresponds to one of embodiments of the invention. Like concrete example 3, concrete example 4 includes, as a structural body CB, a slit portion (first slit portion) SL1 corresponding to a first structural body and a slit portion (second slit portion) SL2 corresponding to a second structural body (depiction of slit portions SL1 and SL2 is omitted). The difference between concrete example 4 and concrete example 3 is that the width of the slit portion SL2 is made equal to the width of the slit portion SL1, and is set at 10 μm.

A liquid crystal cell, which was manufactured on the basis of concrete example 4, was assembled as a module, and the optical characteristics thereof were measured. The transmittance of the liquid crystal cell was 4.8%, and the contrast ratio was 850. It was confirmed that optical characteristics, which are equal to or better than those in concrete examples 1 and 2, are obtainable.

The response time was 65 msec, under the condition that the slowest response time between gray levels was measured when eight gray levels were displayed, and a sufficient improvement in response speed was confirmed. When motion video was displayed, no "trailing" was confirmed, and a higher display quality with higher smoothness than concrete example 1 was obtained.

CONCRETE EXAMPLE 5

Concrete example 5 corresponds to one of embodiments of the invention. Like concrete example 3, concrete example 5 includes, as a structural body CB, a slit portion (first slit portion) SL1 corresponding to a first structural body and a slit portion (second slit portion) SL2 corresponding to a second structural body (depiction of slit portions SL1 and SL2 is omitted). The difference between concrete example 5 and concrete example 3 is that the width of the slit portion SL2 is made greater than the width of the slit portion SL1, and is set at 15 μm.

A liquid crystal cell, which was manufactured on the basis of concrete example 5, was assembled as a module, and the optical characteristics thereof were measured. The transmittance of the liquid crystal cell was 4.0%, and the contrast ratio was 750. It was confirmed that with the increase of the width of the slit portion SL2 which is disposed in the region that contributes to display, although the transmittance becomes lower than in concrete example 1, the contrast ratio becomes higher than in concrete examples 1 and 2, and good optical characteristics are obtainable.

The response time was 55 msec, under the condition that the slowest response time between gray levels was measured when eight gray levels were displayed, and a sufficient improvement in response speed was confirmed. When motion video was displayed, no "trailing" was confirmed, and a higher display quality with higher smoothness than concrete example 1 was obtained.

From the result of the comparison between the respective concrete examples as described above, it is found that as the second structural body which is adopted in order to increase the region where the electric field is mainly inclined, the slit, rather than the protrusion, is effective in maintaining the optical characteristics, such as the transmittance and contrast ratio, at tolerable levels. The reason for this is that in the case where the second structural body is formed of the insulative protrusion, the alignment of liquid crystal molecules is already inclined at the time of non-application of voltage due to the influence of the stepped edge portions of the protrusion, and light leak occurs.

In the case where the second structural body is formed of the slit portion, if the area of the slit portion is increased, the response time tends to be shorter, but the transmittance lowers. Thus, it is desirable that the width of the second structural body be not greatly increased and be set to be equal to or less than the width of the first structural body.

Preferably, the pixel pitch should be set at 50 μm or less. It is thus effective to apply the present invention to a small-sized, high-definition liquid crystal display device. In the case where the pixel pitch is large, the size of the pixel electrode EP is large. Hence, even if the structural body is disposed, the effect of improvement of the response speed is not obtained.

For example, as regards the structure of concrete example 1, the roughness of the image quality, relative to the pixel pitch, was evaluated, and a result shown in FIG. 15 was obtained. According to this result, when the pixel pitch was 50 μm or less, almost no roughness was visually recognized, and display with good image quality was effected. When the pixel pitch was greater than 50 μm, roughness was recognized.

As has been described above, in the present embodiment, in addition to the first structural body (the protrusion or the slit portion of the electrode) for mainly restricting the direction of inclination of liquid crystal molecules, there is further provided the second structural body (the protrusion or the slit portion of the electrode) for inclining the electric field and decreasing the time (i.e. response time) of inclination of the liquid crystal.

According to the present embodiment, there can be provided a liquid crystal display device of high definition of 200 ppi or more, in particular, about 300 to 400 ppi, which has a high screen display quality, wherein the response time can be decreased without degrading optical characteristics, and motion video can be viewed without unnaturalness.

The present invention is not limited directly to the above-described embodiments. In practice, the structural elements can be modified and embodied without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined.

The above-described embodiments relate to the cases using transmissive liquid crystal display panels. The invention, however, is also applicable to transflective liquid crystal display devices wherein each of the pixels includes a transmissive display part and a reflective display part.

In addition, the above-described embodiments relate to the cases in which the storage capacitance line, which is disposed in a manner to cross a substantially central part of the pixel electrode, is a light-blocking wiring line. However, in the structure in which the scanning line is disposed in a manner to cross a substantially central part of the pixel electrode, the scanning line, in place of the storage capacitance line, functions as the light-blocking wiring line.

Furthermore, in a concrete example, the insulative protrusion and the slit portion that is formed in the electrode may be combined as the structural body CB. Specifically, one of the first structural body and the second structural body may be a protrusion which is disposed on the array substrate or counter-substrate, and the other may be a slit portion which is formed in the counter-electrode or pixel electrode.

What is claimed is:

1. A liquid crystal display device which is configured such that a liquid crystal layer including liquid crystal molecules having negative dielectric constant anisotropy is held between a first substrate and a second substrate, comprising:

pixel electrodes which are disposed in association with a plurality of pixels which are arrayed in a matrix, in the first substrate;

a first alignment film which covers the pixel electrodes and aligns the liquid crystal molecules in a direction substantially perpendicular to the first substrate;

light-blocking wiring lines which cross the pixel electrodes and are formed of a light-blocking, electrically conductive material;

a counter-electrode which is disposed in common with the plurality of pixels, in the second substrate;

a second alignment film which covers the counter-electrode and aligns the liquid crystal molecules in a direction substantially perpendicular to the second substrate; and a slit portion which controls an alignment direction of the liquid crystal molecules in a manner to form a multi-domain in each of the pixels, and is formed in the pixel electrode or the counter-electrode, wherein the slit portion includes a first slit portion which extends parallel to the light-blocking wiring line and overlaps the light-blocking wiring line, and a second slit portion which is substantially perpendicular to the first slit portion, extends parallel to a long side of the pixel electrode, is shorter than the long side of the pixel electrode, and is narrower than the first slit portion, wherein the first slit portion and the second slit portion cross at a substantially central part on the pixel electrode, and wherein the first slit portion is formed in the counter-electrode, and crosses the pixel electrodes disposed on the plurality of pixels.

2. The liquid crystal display device according to claim 1, wherein the light-blocking wiring line is a scanning line or a storage capacitance line, which extends in a row direction of the pixels.

3. The liquid crystal display device according to claim 1, wherein a pixel pitch is 50 μm or less.

4. The liquid crystal display device according to claim 1, wherein regions where the pixel electrode is opposed to the counter-electrode include regions formed between both ends of the second slit portion and short sides of the pixel electrode.

5. A liquid crystal display device which is configured such that a liquid crystal layer including liquid crystal molecules having negative dielectric constant anisotropy is held between a first substrate and a second substrate, the liquid crystal display device comprising:

a pixel electrode which is disposed in the first substrate, the pixel electrode including a pair of short sides which extend in a first direction and a pair of long sides which extend in a second direction crossing the first direction;

a first alignment film which covers the pixel electrode and aligns the liquid crystal molecules in a direction perpendicular to the first substrate;

a light-blocking wiring line which extends in the first direction, crosses the pixel electrode and is formed of a light-blocking, electrically conductive material;

a counter-electrode which is disposed in the second substrate, the counter-electrode including a single first slit portion which extends in the first direction through a central part of the pixel electrode, crosses the pair of long sides, and overlaps the light-blocking wiring line, and the counter-electrode further including a single second slit portion which extends in the second direction, crosses the first slit portion at the central part of the pixel electrode, is shorter than the pair of long sides, and is narrower than the first slit portion; and a second alignment film which covers the counter-electrode and aligns the liquid crystal molecules in a direction perpendicular to the second substrate.

6. The liquid crystal display device according to claim 5, wherein the light-blocking wiring line is a scanning line or a storage capacitance line.

7. The liquid crystal display device according to claim 5, wherein a pixel pitch is 50 µm or less.

8. The liquid crystal display device according to claim 5, wherein regions where the pixel electrode is opposed to the counter-electrode include regions formed between both ends of the second slit portion and short sides of the pixel electrode.

* * * * *